3,647,754
PREPARATION OF MACROMOLECULAR FORMALDEHYDE POLYMERS

Jentje Bonnema, Beek, and Emanuel M. J. Pijpers, Elsloo, Netherlands, assignors to Stamicarbon N.V., Heerlen, Netherlands
No Drawing. Continuation-in-part of application Ser. No. 509,606, Nov. 24, 1965. This application Mar. 27, 1970, Ser. No. 23,488
Int. Cl. C08g 1/02, 1/12
U.S. Cl. 260—67                    15 Claims

ABSTRACT OF THE DISCLOSURE

A process for the preparation of macromolecular formaldehyde polymers is described wherein formaldehyde containing substantial amounts of water, e.g., from 0.5% up to 7% or even more, may be polymerized. The catalysts used for this process are certain titanium compounds dissolved in an inert liquid medium, such as titanic esters of alcohols, cyclo alcohols, phenols and thiophenols; titanium salts of organic salts and other organic titanium compounds.

---

This is a continuation-in-part of my now abandoned application Ser. No. 509,606, filed Nov. 24, 1965.

The invention relates to a process for the preparation of macromolecular formaldehyde polymers by contacting formaldehyde containing at least 0.5% by weight of water with a liquid inert medium containing a metallic catalyst.

By the term macromolecular formaldehyde polymers we intend to mean those formaldehyde polymers having an inherent viscosity greater than unit, said viscosity being measured on a 0.5% by weight solution of the polymer in para-chlorophenol with 2% by weight of α-pinene at 60° C.

By the term inert medium we refer to a medium which is inert, under the polymerization conditions involved herein, with regard to the formaldehyde reactant and the catalyst to be used.

A great number of catalysts suited for polymerization of water-free or substantially water-free formaldehyde have been developed and are already known. In French Pat. No. 1,286,718 it is suggested to employ an organic titanate for the polymerization of formaldehyde under anhydrous conditions. United States Pat. No. 2,848,437 discusses the use of various metals organic compounds, such as metal-alcholates, metal-mercaptides and metal salts of organic carboxylic acids for the polymerization of formaldehyde containing at most 0.5% by weight of water. In said U.S. Pat. 2,848,437, the above-mentioned catalysts were tried with wet formaldehyde reactant containing approximately 2.5% by weight of water and hardly any polymer was formed.

Belgian Pat. 608,221 describes a procedure by which formaldehyde with 0.5 to 0.9% by weight of water is polymerized by means of catalysts composed of stannous, zinc, cupric, cadmium, nickel, manganous, ferrous and antimony III salts of organic carboxylic acids containing at least 3 carbon atoms or by means of diphenyltin or triphenylbismuth as catalysts. It is also stated therein that the addition of, say tetrabutyltitanate to the catalyst tends to lower the molecular weight of the polymer.

In the procedures described in the abovementioned patents, complete or substantially complete absence of water is considered essential to the polymerization reaction because otherwise no macromolecular polymer could be obtained. The absence of water is achieved, e.g., by passing the impure formaldehyde, which can be obtained from thermal decomposition of, say, a low-molecular weight polymer, such as paraformaldehyde, through a number of vessels cooled below 0° C. These cooled vessels may optionally a liquid hydrocarbon.

Another known procedure for obtaining water-free formaldehyde is to perform the purification by passing the impure formaldehyde through a column which is cooled below 0° C. and is filled with a drying agent, such as activated silica.

With these known methods of purification of formaldehyde, a substantial amount of low-molecular weight polymers are still formed during the purification processes so that the yield of monomeric formaldehyde which can be polymerized to macromolecular polymers remains relatively low. Another disadvantage with the known purification methods is that the formation of low molecular weight polymers may form deposits inside the equipment obstructing the flow so that extra preventive measures, such as the addition of acid to the starting material, are needed to prevent this.

The above-mentioned purification steps, along with the difficulty attendant thereto, can be omitted in the polymerization of formaldehyde only if a catalyst is used which, nothwithstanding the presence of relatively substantial amounts of water in the formaldehyde, will yield a macromolecular product. Belgian Pat. No. 616,168 suggests the use of certain stannous compounds as a catalyst in the polymerization of formaldehyde containing even up to 5% by weight of water. It is stated in the last-mentioned Belgian patent that if titanium compounds are used in the catalyst, formaldehyde containing like amounts of water cannot possibly be polymerized in good yields to a macromolecular product.

Elsewhere in the non-prepublished Dutch Pat. No. 6408845 dissolved carbon-free or halogen-free salts of an element whose halides are Friedel-Crafts catalysts, with the exception of mercury, have been suggested as catalyst for the polymerization of formaldehyde. We have found, however, that when the formaldehyde has a substantial water content, as mentioned above, the use of, for example, a solution of titanylsulphate dissolved in acetone as catalyst does not yield satisfactory results because the products thus obtained have a very low inherent viscosity, i.e., below 0.5. The use of titanium-tetrachloride also results in products of similarly low inherent viscosity ($n=0.36$). No satisfactory prior process for the polymerization of formaldehyde to a macromolecular polymer, using a titanium metal catalyst has thus far been indicated in prior teachings.

It is an object of the invention to provide a novel process for preparing macromolecular formaldehyde polymers from monomeric formaldehyde, particularly containing substantial amounts of water, and wherein a titanium catalyst is used.

It is a further object of the invention to provide a more satisfactory and economical process for the preparation of macromolecular formaldehyde polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. Unless otherwise provided, all percentages are by weight.

Surprisingly, applicant has now found that when certain titanium compounds are employed as catalysts, formaldehyde containing even more than 0.5% by weight of water can be polymerized in high yields into a macromolecular polymer.

The process of preparing maromolecular formaldehyde polymers according to this invention comprises contacting formaldehyde containing more than 0.5% by weight of water with a liquid inert medium containing a dissolved organic titanium compound as the metallic catalyst.

The formaldehyde to be used according to the invention should contain an amount of water of the order of at least about 1% by weight, or more, and certainly more than 0.5%. The water content may preferably and conveniently range between 1 and 7% by weight of formaldehyde. In particular, the present invention is advantageously carried out with formaldehyde containing from 1.5 to 5% by weight of water because this material can be easily obtained through the pyrolytic depolymerization of commercial paraformaldehyde.

The highest permissible water content depends on a variety of factors, e.g., the desired properties of the polymer to be produced, the catalyst to be used and the reaction medium. In general, the higher the water content of the formaldehyde starting material, the lower will be the polymer viscosity. Application of, e.g., titaniumoleate in toluene with formaldehyde containing approximately 6% by weight of water yields a polymer having an inherent viscosity of 2.5. Formaldehyde with even as much as 9-10% by weight of water can be polymerized, according to this invention, to give a polymer having an inherent viscosity of about 1.

By a dissolved organic titanium compound, we mean an organic titanium compound containing at least one carbon atom and dissolved in an inert liquid medium as defined above. Examples of such compounds which may be used according to the invention are the titanic esters of alcohols, such as ethyl alcohol, isopropyl alcohol, alkyl alcohol, butyl alcohol, isobutyl-alcohol, trimethylsilano, isooctylalcohol, decyl alcohol, 2-ethylhexyl alcohol and benzyl alcohol. The preferred compound is tetrabutyltitanate, this compound being relatively inexpensive and easily handled under industrial conditions. Titanic esters of alicyclic alcohols, such as cyclohexanol and cyclopentanol can also be used. Other suitable compounds are phenolic titanium compounds such as titanium-phenolate, titaniumthiophenolate and titaniumphenol and titanium thiophenol compounds, in which the phenol or the thiophenol radical may be substituted by alkyl, alkoxy, halogen or nitro groups. Instead of the above-mentioned titanium compounds containing a single aromatic ring, aryl titanium compounds with polynuclear ring systems such as those of naphthalene, phenanthrene and anthracene may also be used. Further, the phenolic ring may be condensed with a heterocyclic ring, as in 8-oxyquinoline. Still other suitable phenolic compounds include phenols with more hydroxyl groups in one ring, such as pyrocatechol. Other titanium compounds that may be used as catalysts according to the invention are the titanium salts of aliphaic carboxylic acids with more than two carbon atoms, such as propionic acid, acrylic acid, heptylcarboxylic acid, palmitic acid, oleic acid, stearic acid, the titanium compounds of alicyclic carboxylic acids, such as cyclopentanecarboxylic aoid and cyclohexanecarboxylic acid, those of aromatic carboxylic boxylic acids, such as cyclopentanecarboxylic acid and toluylic acid, of xanthogenic acids, of carbonic acid semiesters or of N-substituted carbamidic acids. Titanium compounds of polybasic acids, such as phthalic acid may also be employed. The substituents in a molecule of a titanium compound need not all be identical in nature. The above-mentioned substituents may occur in any orbitrary arrangement in one molecule, while thiol, hydroxyl and/or halogen groups may be present at the same time. Examples are titaniummethyl, titaniumbutyl, isopropoxytitaniumstearate, isobutoxytitaniumstearate, n-butoxytitaniumoleate, methoxytitaniumbutyrate, phenoxytitaniumstearate, phenoxytitaniumoleate, butoxytitaniumbromide, diisopropoxytitaniumchloride, phenoxytitaniumchloride, thiophenoxytitaniumhydroxide and biscyclopentadienylbisthiophenoxytitanium.

It is preferred, however, to use titanium compounds having the formula $TiR_mX_n$, where R is an alkyl, cycloalkyl aryl, aralkyl, alcoholate, thiolate, aryloxy, thioaryloxy, acyl, thioacyl, acycloxy or a thioacyloxy group and X denotes a halogen, a hydroxyl or a thiol group, and where $m$ and $n$ are integers totaling 2, 3 or 4 and $m$ is not zero.

Beside the above-mentioned compounds, use may also be made of compounds having a general formula:

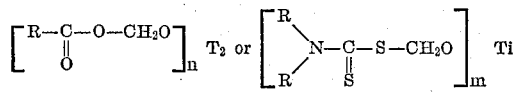

which are formed by adding a molecule of titanium salt of an aliphatic, cycloaliphatic, araliphatic or aromatic carboxylic acid, or of a dithiocarbaminic acid, to a formaldehyde molecule.

Finally, titanium-containing chelate compounds may be employed, such as tributoxytitanium acetylacetonate, diisopropoxy titaniumdiacetylacetonate and titaniumtriacetylacetonate. It has been found, however, that the formaldehyde that can be polymerized by means of the said chelate compounds must have at most a slightly lower water content than the wettest formaldehyde which can be used with the previously mentioned titanium compounds for the preparation of macromolecular polymers.

An advantage of the process using catalysts according to the invention is that unlike the known inorganic titanium compounds, the organic titanium compounds used herein are generally non-toxic, so that there is no objection to contact of foodstuffs and other articles with the polymer prepared by means of the present invention. Further advantages are that these titanium compounds are relatively cheap and that more water can be present in the monomeric formaldehyde than with the use of the prior art catalysts. The permissibility of the presence of water is the more surprising because certain titanium compounds, such as tetrabutoxytitanium, are known to hydrolyze very readily upon contact with water and to form wax-like titanium containing polymers.

Only relatively very small quantities of the titanium compounds need be employed, according to the invention, e.g., amounts varying from about 0.001 to 0.5 mole percent with respect to the amount of formaldehyde to be polymerized, although amounts less than 0.001 mole percent may be used in certain cases. Preferably, an amount of about 0.01 to 0.1 mole percent is used. The use of quantities larger than 0.5 mole percent will, generally, not bring added advantages to the process.

Suitable inert liquid media are alkyl ketones, e.g., acetone, methylethylketone and cyclohexanone, alkyl esters, e.g., ethylacetate, alkyl ethers, e.g., diethylether, tetrahydrofuran or dioxane, and acetals, alkyl nitriles, e.g., acetonitrile, saturated aliphatic hydrocarbons, e.g., hexane, heptane, cycloaliphatic, aromatic hydrocarbons, e.g., benzene, toluene or xylene and halogenated, nitrated or otherwise substituted alkyl and aryl hydrocarbons, e.g., ethylenedichloride, nitromethane, carbontetrachloride, carbondisulphite and nitrobenzene. Generally, acetone, tetrahydrofuran, methylenechloride, heptane, and toluene are preferred as the inert liquid medium because the polymers formed in these vehicles possess a relatively high inherent viscosity. In this respect, acetone is particularly preferred because the polymer can be very easily recovered from the inert liquid medium by filtration.

The titanium compounds may be added to the polymerization medium in the solid state but it is normally preferable to add the catalysts in the form of a liquid solution, preferably in the medium in which the polymerization is to take place. The catalyst may be supplied to the reaction medium either continuously or intermittently. During a batch experiment, the total amount of catalyst needed may be present in the polymerization medium even before the formaldehyde is supplied.

Preferably, only a portion of the catalyst is present in the reaction medium before the polymerization starts, the remainder of the catalyst being added during the polymerization. If desired, other substances may be introduced during the polymerization, such as chain transfer agents, antioxidants, stabilizers, fillers, pigments and the like.

The polymerization reaction is preferably carried out continuously. The process may, however, also be carried out discontinuously, or batch-wise. The temperature at which the process according to the invention can be effected, may be varied between wide limits, e.g., between −120 and +100° C. Preferably, the polymerization is carried out between −40 and +60° C. Most conveniently, the polymerization may be carried out at room temperature with good results. The pressure during the polymerization is not critical. The process according to the invention may be carried out at any convenient pressures of, say, 2, 3, 5 and 10 atmospheres or higher; the process may also be effected at sub-atmospheric pressures, e.g., at ½, ¼ and ⅒ atmosphere.

The formaldehyde used for the polymerization may be obtained by any simple means, e.g., from the formaldehyde-water vapor mixtures produced by oxidation of methanol after the water content has been adjusted to the desired level. The formaldehyde used may be obtained in a very convenient manner by thermal depolymerization of low molecular-weight formaldehyde polymers, such as paraformaldehyde, α- and β-polyoxymethylene, with water contents up to 10% by weight. It is preferred to use commercial paraformaldehyde containing from 1.5–5% by weight of water. The depolymerization reaction can be carried out in the presence of any suitable high-boiling vehicle, such as paraffin oil, or other known vehicles having a low volatility at the pyrolysis temperature, such as dioctylphthalate. The pyrolysis gases from such reaction may, without purification, be fed directly to the polymerization reactor through heated or unheated conduits. The yield of macromolecular polymer is then very large since no "prepolymer" is formed.

The formaldehyde may also be carried to the polymerization reactor by a stream of inert gas or vaporized inert solvents. The flow of formaldehyde to the reactor can also be maintained without the employment of a carrier gas or other ancillary means. Another method is to absorb the gaseous formaldehyde outside the polymerization reactor in a vehicle and then feed the resulting solution to the reactor where, by contacting with the catalyst, a macromolecular polymer is obtained.

By polyoxymethylenes there is meant herein both the homopolymers of formaldehyde and the copolymers which consist substantially (preferably 90 mole percent or more) of formaldehyde, and comonomers such as isobutene, dioxolone, vinylethers, vinyl-nitrogen compounds, cyclic ether such as ethylene oxide, epichlorohydrin and dioxolan, and substituted and unsubstituted aldehydes and ketones.

The polymers obtained according to the invention may, if desired, after protection of the end groups (for example, by esterification or etherization) and after addition of customary additives, be processed into filaments, films or other shaped products, in accordance with known technology. The invention will be further described with reference to the following examples without being restricted thereto. For the examples, the acetone used is commercial acetone which, unless otherwise stated, contains 0.3% by weight of water.

EXAMPLE 1

38 g. of paraformaldehyde containing approximately 3% by weight of water was pyrolyzed in paraffin oil at 170° C. The pyrolysis gases were fed through lines heated at approximately 80° C. to a polymerization reactor containing 250 ml. of toluene with 0.25 mmol of titaniumoleate, the temperature during the polymerization being kept at 20° After the reaction proceeded for 60 minutes, during which period the reaction medium was vigorously stirred, the polymer was recovered and washed several times with acetone and then dried. The yield was 34 g. of snowwhite polymer having an inherent viscosity of 7.4.

EXAMPLE 2

Example 1 was repeated except that methylene chloride was used as the vehicle. A polymer with an inherent viscosity=6.1 was obtained.

EXAMPLE 3

Using tetrahydrofuran as vehicle and under the same conditions as in Example 1, a polymer with an inherent viscosity of 6.1 was obtained.

EXAMPLES 4–6

Using the catalysts and vehicles as shown in the table below and working under the same conditions as in the previous examples, an excellent yield of snow-white formaldehyde polymer was obtained.

| Example | Catalyst | Vehicle | Polymer yield. g. | Inherent viscosity |
|---|---|---|---|---|
| 4 | Titanium stearate | Heptane | 33 | 3.2 |
| 5 | Tetrabutyltitanate | do | 36 | 2 |
| 6 | Titanium phenolate | Methylene-chloride. | 34 | 2.4 |

EXAMPLES 7–11

Working under the same conditions as in Example 1, but using the catalysts and vehicles shown in the table below, an excellent yield of macromolecular formaldehyde copolymers was obtained.

| Example | Catalyst | Vehicle | Polymer yield. g. | Intrinsic viscosity |
|---|---|---|---|---|
| 7 | Titanium cyclohexanecarboxylate. | Heptane | 31 | 2.0 |
| 8 | Titanium heptanecarboxylate. | Toluene | 36 | 1.1 |
| 9 | Titanium decanolate | do | 34 | 1.5 |
| 10 | do | Acetone | 27 | 1.5 |
| 11 | Titanium trimethyl-silanolate. | Methylene-chloride. | 35 | 1.1 |

EXAMPLES 12–14

Working under the same conditions as in Example 1, but using the catalysts and vehicles tabulated below, an excellent yield of macromolecular formaldehyde polymers was obtained.

| Example | Catalyst | Vehicle | Polymer yield. g. | Intrinsic viscosity |
|---|---|---|---|---|
| 12 | Diisopropoxy titaniumdichloride. | Acetone | 27 | 1.4 |
| 13 | Isopropoxy titaniumstearate. | Toluene | 35 | 4.1 |
| 14 | Tributoxy titanium-acetylacetonate. | Acetone | 32 | 1.1 |

EXAMPLE 15

Using monomeric formaldehyde containing approximately 4% by weight of water under the same polymcatalyst being biscyclopentadienyl-bisthiophenoxy-titanium in anhydrous acetone, a formaldehyde polymer was obtained having an intrinsic viscosity equal to 1.1.

EXAMPLE 16

Working under the same conditions as in Example 5, but using a polymer of tetrabutyltitanate in benzene, 33 g. of formaldehyde polymer with an intrinsic viscosity equal to 1.5 were obtained. The catalyst used had a molecular weight of about 2700, and it was obtained by evaporation of a mixture containing equal parts by weight of tetrabutyltitanate and butanol to which a solution of 3.6 ml. of water in 200 ml. of butanol had been added dropwise at room temperature.

EXAMPLE 17

Working under the same conditions as in Example 1, but with continuous addition of sufficient water to the pyrolysis reactor so that the pyrolysis gases contained 6% by weight of water, and using 250 ml. of toluene with 0.25 mmol of titanium-oleate as polymerization medium, a macromolecular polymer having an inherent viscosity=2.5 was obtained.

EXAMPLE 18

In this experiment, the water content of the pyrolysis gas in Example 17 was raised to 9% by weight. A high yield of a polymer with an inherent viscosity=1.2 was obtained.

EXAMPLE 19

In a test on a larger scale, 250 g./hr. of commercial paraformaldehyde with a water content of about 3% by weight was decomposed in 750 g. of paraffin oil at a temperature of 175° C. The pyrolysis gases were fed through pipes heated with steam at 130° C. to the polymerization reactor which had a volume of 4 liters and was provided with a gas supply pipe, a stirrer and a cooling jacket. The polymerization medium was acetone which was kept at 20° C. during the polymerization. Titanium oleate was the catalyst employed. Every hour 2 liters of vehicle and 0.25 mmol of catalyst were fed to the polymerization reactor along with 0.5 g. of methanol for lowering the molecular weight of the polymer product. The test lasted 50 hours, after which period no prepolymer depositions were observed in the equipment. Portions of the reaction medium were periodically discharged from the polymerization reactor and filtered and washed. An hourly yield of 220 g. of macromolecular white polymer with an inherent viscosity=4 was obtained.

What is claimed is:

1. A process for the preparation of macromolecular formaldehyde polymers comprising providing an inert liquid medium for the polymerization reaction, incorporating an organic titanium compound into said inert liquid medium as the catalyst for said polymerization reaction, and contacting formaldehyde monomer with said catalyst in said liquid medium to polymerize the same to said polymer, wherein said monomeric formaldehyde contains at least about 1% by weight of water, and said organic titanium catalyst has the formula

where R is selected from the class consisting of alkyl, cycloalkyl, aryl, aralkyl, cyclopentadienyl, alcoholate, thiolate, aryloxy, thioaryloxy, acyl, thioacyl, acyloxy, thioacyloxy and radicals having one of the general formulae

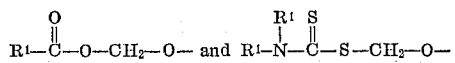

wherein $R^1$ is selected from the class consisting of alkyl, cycloalkyl, aralkyl and aryl groups; X is selected from the class consisting of halogen, hydroxyl and thiol; m and n are integers having a sum of 2, 3 or 4 and m is at least one.

2. A process according to claim 1 wherein said catalyst is titanium oleate.

3. A process according to claim 1 wherein said catalyst is titanium stearate.

4. A process according to claim 1 wherein said catalyst is titanium phenolate.

5. A process according to claim 1 wherein said catalyst is tetrabutyl titanate.

6. A process according to claim 1 wherein said inert liquid medium is toluene.

7. A process according to claim 1 wherein said inert liquid medium is acetone.

8. A process according to claim 1 wherein said inert liquid medium is tetrahydrofuran.

9. A process according to claim 1 wherein said inert liquid medium is methylenechloride.

10. A process according to claim 1 wherein said inert liquid medium is heptane.

11. A process according to claim 1 wherein said polymerization is carried out at a temperature of about −40° to 60° C.

12. A process according to claim 1 wherein said monomeric formaldehyde contains more than 1% to about 10% by weight of water.

13. A process for the preparation of macromolecular formaldehyde polymers comprising providing an inert liquid medium for the polymerization reaction, incorporating an organic titanium compound into said inert liquid medium as the catalyst for said polymerization reaction, and contacting formaldehyde monomer with said catalyst in said liquid medium to polymerize the same to said polymer, wherein said monomeric formaldehye contains from about 1 to 7% by weight of water, and said organic titanium catalyst has the formula

where R is selected from the class consisting of alkyl, cycloalkyl, aryl, aralkyl, cyclopentadienyl, alcoholate, thiolate, aryloxy, thioaryloxy, acyl, thioacyl, acyloxy, thioacyloxy and radicals having one of the general formulae

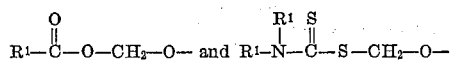

wherein $R^1$ is selected from the class consisting of alkyl, cycloalkyl, aralkyl and aryl groups; X is selected from the class consisting of halogen, hydroxyl and thiol; m and n are integers having a sum of 2, 3 or 4 and m is at least one.

14. A process for the preparation of macromolecular formaldehyde polymers comprising providing an inert liquid medium for the polymerization reaction, incorporating an organic titanium compound into said inert liquid medium as the catalyst for said polymerization reaction, and contacting formaldehyde monomer with said catalyst in said liquid medium to polymerize the same to said polymer wherein said monomeric formaldehyde contains from about 1.5 to 5% by weight of water, and said organic titanium catalyst has the formula

where R is selected from the class consisting of alkyl, cycloalkyl, aryl, aralkyl, cyclopentadienyl, alcoholate, thiolate, aryloxy, thioaryloxy, acyl, thiacyl, acyloxy, thioacycloxy and radicals having one of the general formulae

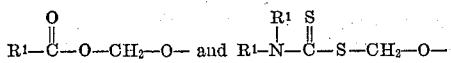

wherein $R^1$ is selected from the class consisting of alkyl, cycloalkyl, aralkyl and aryl groups; X is selected from the class consisting of halogen, hydroxyl and thiol; m and n are integers having a sum of 2, 3 or 4 and m is at least one.

References Cited

UNITED STATES PATENTS 2,848,437   8/1958   Langsdorf et al. _____ 260—67 FP WILLIAM H. SHORT, Primary Examiner L. M. PHYNES, Assistant Examiner U.S. Cl. X.R.

260—64, 73